US012347942B2

(12) United States Patent
Chang

(10) Patent No.: US 12,347,942 B2
(45) Date of Patent: Jul. 1, 2025

(54) MOBILE DEVICE

(71) Applicant: NANJING SILERGY MICRO (HK) CO., LIMITED, Causeway Bay (HK)

(72) Inventor: Chia-Lin Chang, Taipei (TW)

(73) Assignee: Nanjing Silergy Micro (HK) Co., Ltd., Nanjing (CN)

( * ) Notice: Subject to any disclaimer, the term of this patent is extended or adjusted under 35 U.S.C. 154(b) by 219 days.

(21) Appl. No.: 17/878,105

(22) Filed: Aug. 1, 2022

(65) Prior Publication Data

US 2023/0040028 A1 Feb. 9, 2023

(30) Foreign Application Priority Data

Aug. 3, 2021 (CN) ......................... 202110888619.0

(51) Int. Cl.
*H01Q 1/22* (2006.01)
*H01Q 5/335* (2015.01)

(52) U.S. Cl.
CPC ........... *H01Q 5/335* (2015.01); *H01Q 1/2266* (2013.01)

(58) Field of Classification Search
CPC ...... H01Q 5/335; H01Q 1/2266; H01Q 1/243; H01Q 5/328; H01Q 21/28; H01Q 1/245
See application file for complete search history.

(56) References Cited

U.S. PATENT DOCUMENTS

| | | | | |
|---|---|---|---|---|
| 9,628,115 B1 * | 4/2017 | Tsai | ..................... | H01Q 1/2283 |
| 2012/0044199 A1 * | 2/2012 | Karpin | .............. | G06F 3/041662 345/174 |
| 2016/0124574 A1 * | 5/2016 | Rouaissia | .............. | H01Q 1/243 345/174 |
| 2017/0123554 A1 * | 5/2017 | Villar | ................... | H01Q 1/2258 |
| 2017/0134022 A1 * | 5/2017 | Kim | ..................... | H03K 17/955 |
| 2018/0069549 A1 * | 3/2018 | Cooper | ................. | H04M 1/026 |
| 2018/0088739 A1 * | 3/2018 | Rouaissia | ................ | H01Q 1/44 |
| 2018/0212313 A1 * | 7/2018 | Harper | ...................... | H01Q 1/50 |
| 2019/0041929 A1 * | 2/2019 | Bologna | ................ | G05B 15/02 |
| 2020/0021029 A1 * | 1/2020 | Chou | ................... | H01Q 9/0421 |

FOREIGN PATENT DOCUMENTS

CN 113629377 B * 11/2023 ............... H01Q 1/22

OTHER PUBLICATIONS

Zhou et al. CN Patent Publication CN113629377 Machine Translation (Year: 2021).*

* cited by examiner

*Primary Examiner* — Hai V Tran
*Assistant Examiner* — Michael M Bouizza

(57) ABSTRACT

A mobile device comprises a touch screen and a frame antenna. The touch screen have a first sensing module. The frame antenna is disposed around the periphery of the touch screen, and the frame antenna further has at least one second sensing module, wherein the first sensing module and the at least one second sensing module form at least one mutual-capacitive sensing loop to sense whether an object approaches or touches the touch screen and the frame antenna.

11 Claims, 4 Drawing Sheets

MOBILE DEVICE

RELATED APPLICATIONS

The present application claims the priority of Chinese Application No. 202110888619.0, filed on Aug. 3, 2021, the disclosure of which is hereby incorporated by reference herein in its entirety.

BACKGROUND OF THE INVENTION

1. Field of the Invention

The present invention generally relates to a mobile device, and, more particularly, to a mobile device having sensing function with specific absorption rate (SAR).

2. Description of the Related Art

In general, in order to prevent the electromagnetic waves generated by mobile devices such as mobile phones or tablet computers from affecting human health, SAR sensing function is necessary for these mobile devices to sense the relative position or the distance between users and the mobile devices. According to the distance or the relative position, the mobile devices adjust the output power or output direction of the radio frequency signals.

However, to achieve SAR sensing function, additional antenna units or conductors are required, which would occupy part of internal space of the mobile devices, and may interfere with the radio frequency signals used for communication, so it is necessary to keep the additional units a proper distance away from the antennas used for communication. The way of the prior art by adding additional antennas to achieve SAR sensing function goes against the miniaturization of the mobile devices. Therefore, how to provide a mobile device having SAR sensing function achieved by the original components of the mobile device has become an urgent problem to be solved in the industry.

SUMMARY OF THE INVENTION

In light of solving the foregoing problems of the prior art, the present invention provides a mobile device having the SAR sensing function achieved by the original components of the mobile device.

In order to solve the aforementioned problems, the mobile device of the present invention comprises a touch screen and a frame antenna. The touch screen have a first sensing module. The frame antenna is disposed around the periphery of the touch screen, and the frame antenna further has at least one second sensing module, wherein the first sensing module and the at least one second sensing module form at least one mutual-capacitive sensing loop to sense whether an object approaches or touches the touch screen and the frame antenna.

In an embodiment, the frame antenna further has at least one feed-in module, and the at least one feed-in module is used to receive or send radio frequency signals via the frame antenna.

In an embodiment, the feed-in module further comprises a matching circuit and a capacitor, and the matching circuit and the capacitor are connected with each other.

In an embodiment, the frame antenna further has six antenna units, and the six antenna units are unconnected with each other or the signals received or sent by the antenna units are separated through a ground capacitor and a ground terminal.

In an embodiment, the six antenna units are used to sense different positions of the mobile device that a human body and an object approaches or touches.

In an embodiment, each of the antenna units has one corresponding feed-in module.

In an embodiment, each feed-in module has one corresponding second sensing module.

In an embodiment, the mobile device further comprises a housing, and the frame antenna is disposed on the housing.

In an embodiment, the first sensing module is composed of a plurality of array sensing units.

In an embodiment, the first sensing module and the second sensing module are further used to sense the way a user holds the mobile device or a sliding gesture used by a user on the mobile device.

In an embodiment, the frame antenna further comprises a inductor and a self-capacitive sensing module, and the inductor and the self-capacitive sensing module are connected with each other.

The mobile device of the present invention comprises the touch screen and the frame antenna, and the at least one mutual-capacitive sensing loop formed by the first sensing module of the touch screen and the at least one second sensing module of the frame antenna to achieve SAR sensing function. Compared to the prior art, in general, the mobile device needs a touch screen and a communication antenna used to receive and send the radio frequency signals. However, the mobile device according to the present invention replaces the communication antenna with the frame antenna, and achieves SAR sensing function through the touch screen and the frame antenna. Therefore, additional antenna components or conductors are not necessary for the mobile device of the present invention, which is good for miniaturization and cost saving.

BRIEF DESCRIPTION OF THE DRAFLAPS

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

Figure 1:
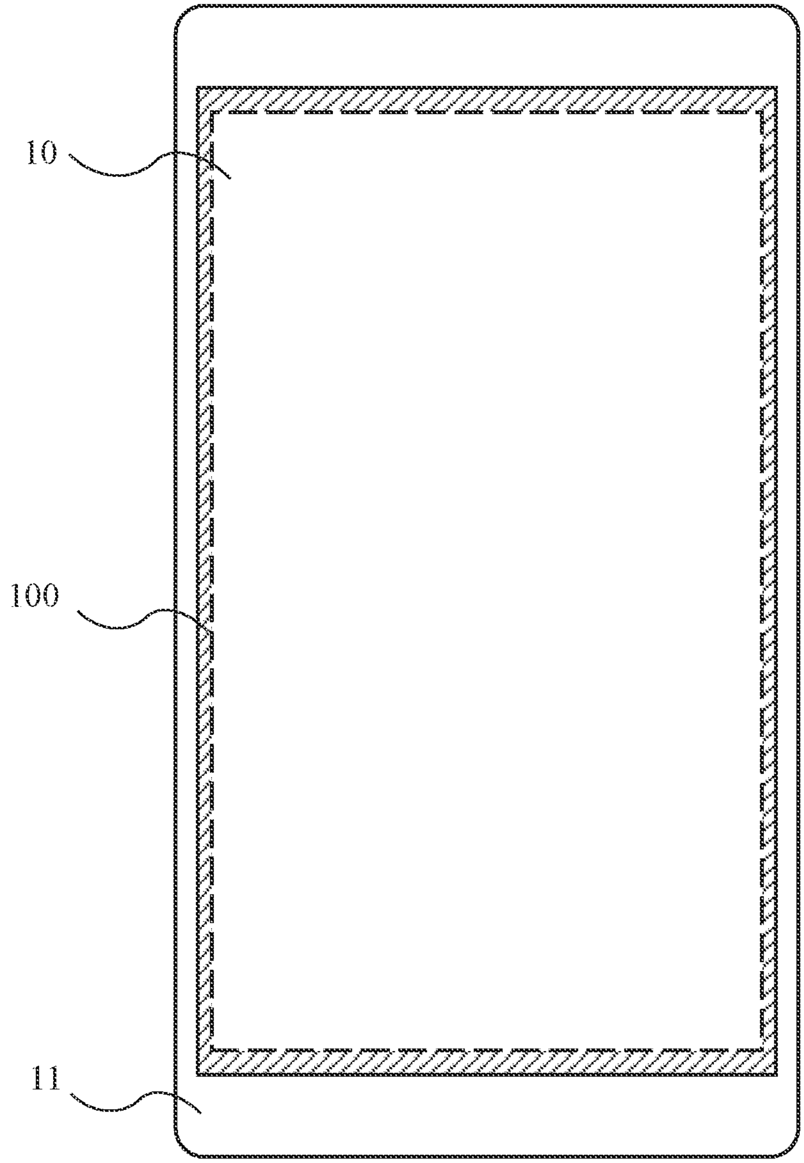
FIG. 1 illustrates a schematic view of a structure of the mobile device according to a first embodiment of the present invention.

Please refer to FIG. 1. FIG. 1 illustrates a schematic view of a structure of the mobile device according to a first embodiment of the present invention. The mobile device of the present invention comprises a touch screen 10 and a frame antenna 11. The touch screen 10 have a first sensing module 100. The frame antenna 11 is disposed around the periphery of the touch screen 10, and the frame antenna 11 further includes at least one second sensing module 110 (not shown in FIG. 1), wherein the first sensing module 100 and the at least one second sensing module 110 form at least one mutual-capacitive sensing loop to sense whether an object, such as a human body, approaches or touches the touch screen 10 and the frame antenna 11.

The functions of the touch screen 10 may be used for touch input and display. More specifically, touch input function of the touch screen 10 may be achieved by capacitive sensing, and part of or all of the capacitive sensing components may be used as the first sensing module 100. The frame antenna 11 is made of metal or other conductive materials and capable of receiving or sending radio frequency signals.

In more detail, the first sensing module 100 and the second sensing module 110 may be used to sense the relative position or the distance between a human body and the mobile device. The mobile device may adjust the output power or output direction of the radio frequency signals according to the distance or the relative position to meet the regulations of the SAR test.

The first sensing module 100 and the second sensing module 110 form a mutual-capacitive sensing loop. In an embodiment, the first sensing module 100 may be the RX sensing unit (receiver) and the second sensing module 110 may be the TX sensing unit (transmitter), or the first sensing module 100 may be the TX sensing unit and the second sensing module 110 may be the RX sensing unit.

Figure 2:
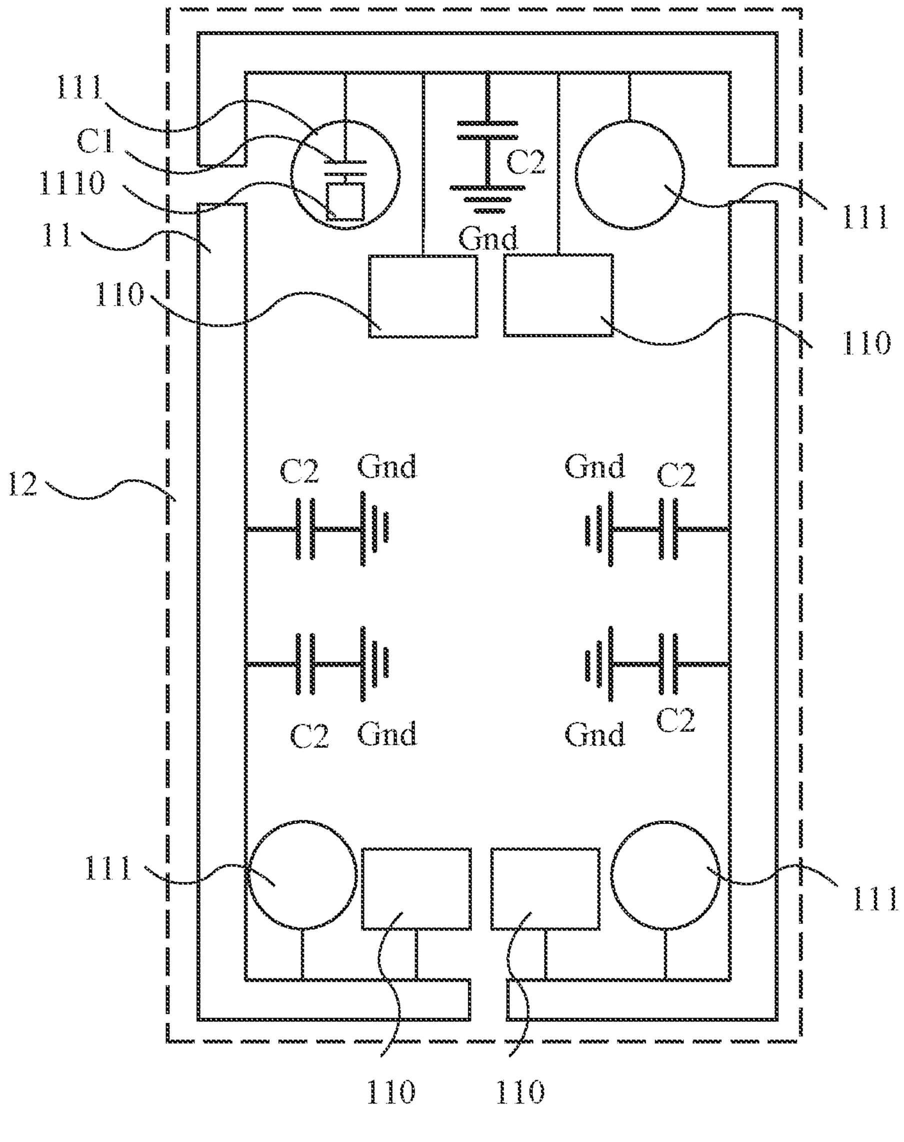
FIG. 2 illustrates a schematic view of a structure of the frame antenna according to a second embodiment of the present invention.

Please refer to FIG. 2. FIG. 2 illustrates a schematic view of a structure of the frame antenna according to a second embodiment of the present invention. In an embodiment, in addition to the second sensing module 110, the frame antenna 11 further has at least one feed-in module 111, and the at least one feed-in module 111 is used to receive or send radio frequency signals via the frame antenna 11. The frame antenna 11 may have one or more second sensing modules 110 and feed-in modules 111 in the present invention, but not limited to. For example, the number of the feed-in modules 111 may be varied based on the requirements of the wireless communication of the mobile device, and the number of the second sensing modules 110 may be varied based on the requirements for sensing the human body.

In an embodiment, the feed-in module 111 may further comprise a matching circuit 1110 and a capacitor C1, and the matching circuit 1110 and the capacitor C1 are connected with each other. The matching circuit 1110 and the capacitor C1 may be used to impede matching or separate the low frequency signals.

Figure 3:
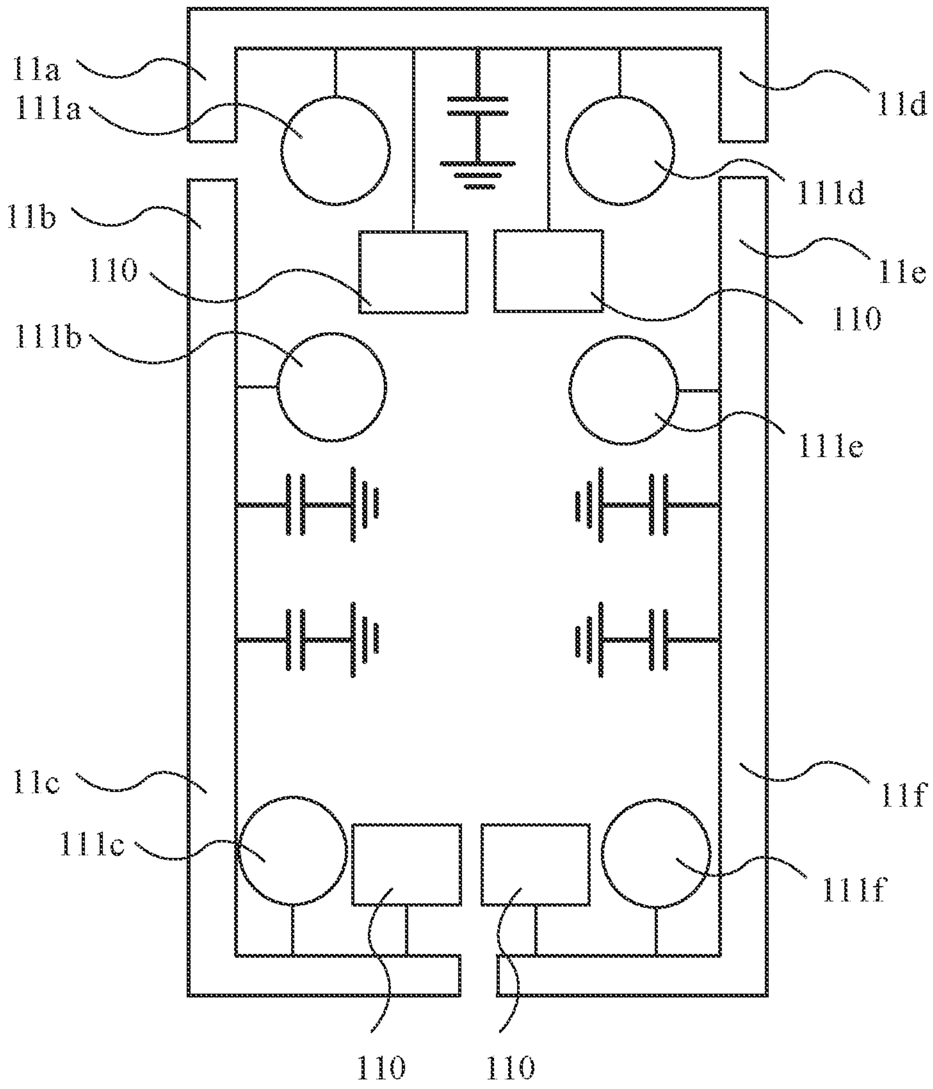
FIG. 3 illustrates a schematic view of a structure of the frame antenna according to a third embodiment of the present invention.

Please refer to FIG. 3. FIG. 3 illustrates a schematic view of a structure of the frame antenna according to a third embodiment of the present invention. In an embodiment, the frame antenna 11 includes six antenna units 11*a*, 11*b*, 11*c*, 11*d*, 11*e* and 11*f*. The six antenna units 11*a*, 11*b*, 11*c*, 11*d*, 11*e* and 11*f*, are unconnected with each other or the signals received or sent by the antenna units are separated via a ground capacitor C2 and a ground terminal Gnd, and they correspond with the feed-in modules 111*a*, 111*b*, 111*c*, 111*d*, 111*e* and 111*f*, respectively.

Specifically, the frame antenna 11 may comprise a plurality of antenna units, such as 11*a*, 11*b*, 11*c*, 11*d*, 11*e* and 11*f*, according to the requirement for wireless communication of the mobile device or sensing the human body. For example, the antenna unit 11*a* is disposed on upper left position of the mobile device. When the feed-in module 111*a* is connected with the antenna unit 11*a*, the feed-in module 111*a* may receive or send the radio frequency signals from the upper left direction of the mobile device via the antenna unit 11*a*. Similarly, when the second sensing module 110 is connected with the antenna unit 11*a*, the second sensing module 110 may sense whether the human body approaches or touches the upper left position of the mobile device.

In an embodiment, the mobile device may further comprise a housing 12, and the frame antenna 11 is disposed on the housing 12. In another embodiment, the frame antenna 11 may be used as the housing 12.

Figure 4:
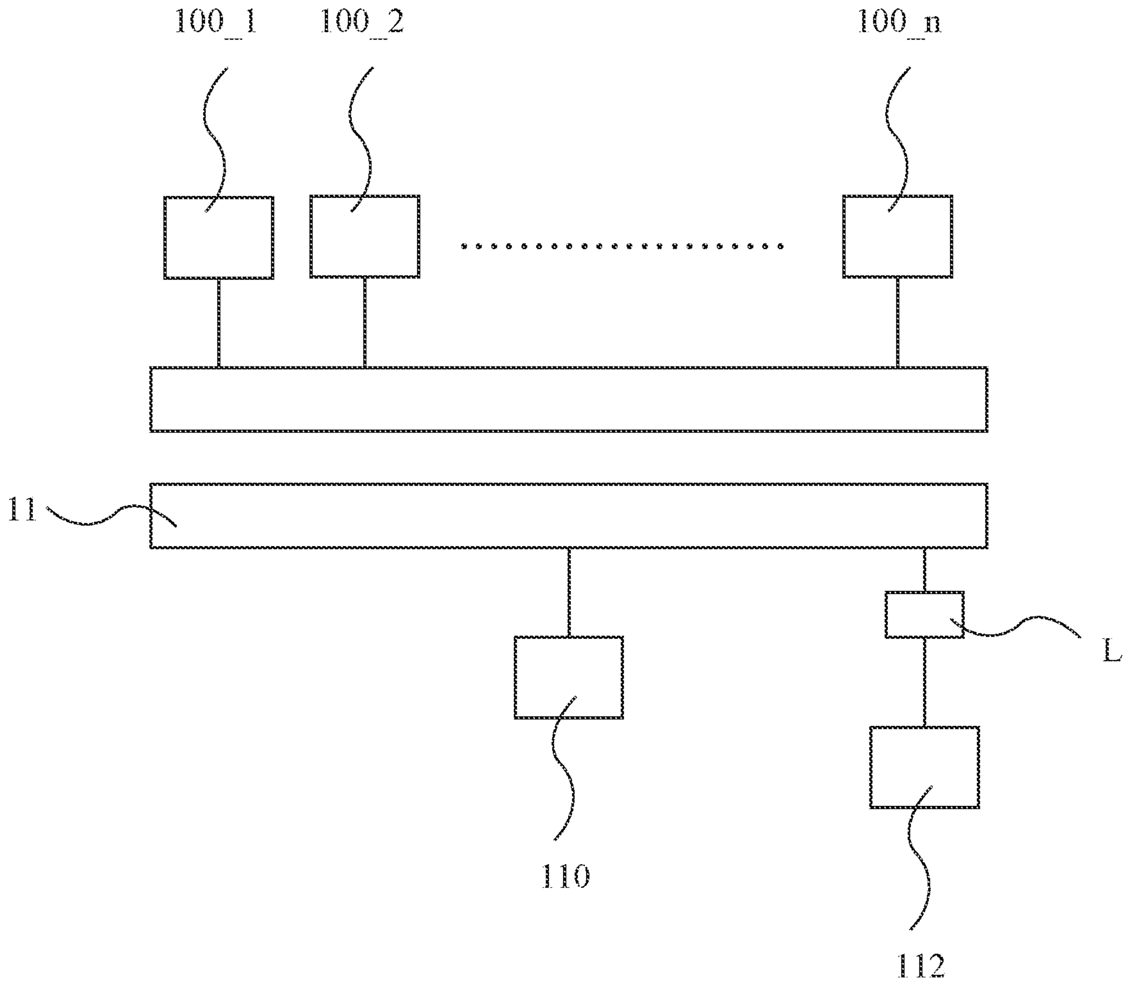
FIG. 4 illustrates part of a schematic view of a structure of the mobile device according to a fourth embodiment of the present invention.

Please refer to FIG. 4. FIG. 4 illustrates part of a schematic view of a structure of the mobile device according to a fourth embodiment of the present invention. In an embodiment, the first sensing module 100 is composed of a plurality of array sensing units, 100_1 to 100_*n*.

In an embodiment, the first sensing module 100 and the at least one second sensing module 110 are further used to sense the way a user holds the mobile device or a sliding gesture used by a user on the mobile device. In more detail, the first sensing module 100 is composed of the plurality of array sensing units, 100_1 to 100_*n*, and the plurality of array sensing units, 100_1 to 100_*n*, respectively form a plurality of sensing loops with the at least one second sensing module 110 to sense whether the user's hand approaches or touches the sensing loops so that the mobile device according to the present invention enables to determine the way the user holds it or the sliding gesture used by the user on it. Furthermore, the mobile device may execute the corresponding instructions or run applications according to the way the user holds it or the sliding gesture.

In an embodiment, the frame antenna 11 may further comprise an inductor L and a self-capacitive sensing module 112, and the inductor L and the self-capacitive sensing module 112 are connected with each other. The self-capacitive sensing module 112 is used to sense the proximity of the human body or objects, and the mutual-capacitive sensing loops formed by the plurality of array sensing units 100_1 to 100_*n* and the at least one second sensing module 110 not only sense the human body and objects but also determine where the capacitance changes. Therefore, the mobile device according to the present invention may determine the types of objects through the characteristic of the self-/mutual-capacitance variation. For example, the mobile device may determine whether the object is a human body, water, metal, plastic, air, etc.

In summary, the mobile device of the present invention comprises the touch screen and the frame antenna, and the at least one mutual-capacitive sensing loop formed by the first sensing module of the touch screen and the at least one second sensing module of the frame antenna to achieve SAR sensing function. Compared to the prior art, in general, the mobile device needs a touch screen and a communication antenna used to receive and send the radio frequency signals. However, the mobile device according to the present invention replaces the communication antenna with the frame antenna, and achieves SAR sensing function by the touch screen and the frame antenna. Therefore, additional antenna components or conductors are not necessary for the mobile device of the present invention, which is good for miniaturization and cost saving.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A mobile device, comprising:

a) a touch screen comprising a first sensing module; and b) a frame antenna disposed around the periphery of the touch screen, and the frame antenna further comprising at least one second sensing module, c) wherein the first sensing module and the at least one second sensing module form at least one mutual-capacitive sensing loop to sense whether an object approaches or touches the touch screen and the frame antenna;

d) wherein when the first sensing module is configured as a receiving sensing unit, the second sensing module is configured as a transmitting sensing unit; and e) wherein when the first sensing module is configured as the transmitting sensing unit, the second sensing module is configured as the receiving sensing unit.

2. The mobile device of claim 1, wherein the frame antenna further comprises at least one feed-in module, and the at least one feed-in module is used to receive or send radio frequency signals via the frame antenna.

3. The mobile device of claim 2, wherein the feed-in module further comprises a matching circuit and a capacitor, and the matching circuit and the capacitor are connected with each other.

4. The mobile device of claim 2, wherein the frame antenna further comprises six antenna units, and the six antenna units are unconnected with each other or the signals received or sent by the antenna units are separated through a ground capacitor and a ground terminal.

5. The mobile device of claim 4, wherein the six antenna units are used to sense different positions of the mobile device that a human body and an object approaches or touches.

6. The mobile device of claim 4, wherein each of the antenna units has one corresponding feed-in module.

7. The mobile device of claim 2, wherein each feed-in module has one corresponding second sensing module.

8. The mobile device of claim 1, wherein the mobile device further comprises a housing, and the frame antenna is disposed on the housing.

9. The mobile device of claim 1, wherein the first sensing module is composed of a plurality of array sensing units.

10. The mobile device of claim 9, wherein the first sensing module and the at least one second sensing module are further used to sense the way a user holds the mobile device or a sliding gesture used by a user on the mobile device.

11. The mobile device of claim 1, wherein the frame antenna further comprises an inductor and a self-capacitive sensing module, and the inductor and the self-capacitive sensing module are connected with each other.

* * * * *